United States Patent
Afman et al.

(10) Patent No.: US 6,214,393 B1
(45) Date of Patent: *Apr. 10, 2001

(54) METHOD OF CURING AND PROCESSING PAR-COOKED BACON DERIVED FROM PORK BELLIES

(75) Inventors: Brent J. Afman, Hammond, IN (US); Kent Thrasher, Sun Prairie, WI (US)

(73) Assignee: OSI Industries, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/356,914

(22) Filed: Jul. 19, 1999

Related U.S. Application Data

(63) Continuation-in-part of application No. 09/119,428, filed on Jul. 20, 1998, now Pat. No. 6,051,264, which is a continuation-in-part of application No. 08/734,700, filed on Oct. 21, 1996, now abandoned, which is a continuation-in-part of application No. 08/437,445, filed on May 4, 1995, now Pat. No. 5,567,460.

(51) Int. Cl.[7] .................................................. A23L 1/318
(52) U.S. Cl. .......................... 426/243; 426/264; 426/281; 426/641; 426/645
(58) Field of Search .................................. 426/243, 281, 426/264, 296, 641, 645

(56) References Cited

U.S. PATENT DOCUMENTS

| | | |
|---|---|---|
| 2,054,626 | 9/1936 | Griffith . |
| 2,902,369 | 9/1959 | Komarik . |
| 2,974,047 | 3/1961 | Holmes . |
| 3,192,056 | 6/1965 | Williams . |
| 3,370,959 | 2/1968 | Moore et al. . |
| 3,595,679 | 7/1971 | Schoch et al. . |
| 3,674,504 | 7/1972 | Lane . |
| 3,741,777 | 6/1973 | Wrobel et al. . |
| 3,868,468 | 2/1975 | Tompkin et al. . |
| 3,906,115 | 9/1975 | Jeppson . |
| 4,029,824 | 6/1977 | Langen . |
| 4,038,426 | 7/1977 | Jesperson et al. . |
| 4,547,379 | 10/1985 | Moeller et al. . |
| 4,753,809 | 6/1988 | Webb . |
| 4,871,561 | 10/1989 | Parker . |
| 4,879,128 | 11/1989 | Morin et al. . |
| 4,954,356 | 9/1990 | Kappes . |
| 4,957,756 | 9/1990 | Olander et al. . |
| 5,472,722 | 12/1995 | Burger . |
| 5,567,460 | 10/1996 | Afman .................................. 426/264 |
| 6,045,841 | 4/2000 | Singh et al. ......................... 426/243 |

FOREIGN PATENT DOCUMENTS

| | | |
|---|---|---|
| 2716425 | 10/1978 | (DE) . |
| 0 666 030 A1 | 8/1995 | (EP) . |
| 0923872 | 6/1999 | (EP) . |
| WO99/04654 | 2/1999 | (WO) . |

OTHER PUBLICATIONS

Schiffner, et al., "Die Herstellung von Kochschinken und Formschinken unter bakteriellem Schutz," Fleisch, vol. 36, No. 3, 1982, pp. 53–57 with translation.

Mattson, et al., "Bacon Precooked by Microwaves Offers the Potential of Lowering Nitrosamine Levels," Food Product Development, 1978, p. 47.

Marriott, et al., "Accelerated Dry Curing Of Pork Legs (Hams): A Review," Journal of Muscle Foods, vol. 3, 1992, p. 159–168.

1988 National Association of Meat Purveyors, "The Meat Buyer's Guide," pp. 122, 129 and 154.

*Primary Examiner*—Arthur L. Corbin
(74) *Attorney, Agent, or Firm*—Wallenstein & Wagner, Ltd.

(57) ABSTRACT

Methods of curing and processing pork bellies into par-cooked bacon have been developed that eliminates smokehouse treatment. The method of the present invention employs a single heating step that both par-cooks a pork belly injected with pickle solution and achieves the necessary weight reduction to meet the regulatory product definition for par-cooked bacon.

11 Claims, 1 Drawing Sheet

METHOD OF CURING AND PROCESSING PAR-COOKED BACON DERIVED FROM PORK BELLIES

RELATED APPLICATION

This is a continuation-in-part of U.S. patent application Ser. No. 09/119,428 filed Jul. 20, 1998, now U.S. Pat. No. 6,051,264, which is a continuation-in-part of Ser. No. 08/734,700 filed on Oct. 21, 1996, now abandoned, which in turn is a continuation-in-part of Ser. No. 08/437,445 filed on Mar. 4, 1995, now U.S. Pat. No. 5,567,460 issued on Oct. 22, 1996.

DESCRIPTION

1. Technical Field

The present invention generally relates to curing and processing pork bellies to produce bacon and, in particular, to a novel method of processing pork bellies into partially cooked or par-cooked bacon without need of smokehouse treatment.

2. Background of the Invention

The term "bacon" broadly defines a category of cured and processed pork bellies. Most commonly, pork bellies are cured and processed into strip form bacon or circular form. The weight and yield of bacon is precisely defined by federal regulation. For example, for cured pork bellies to be labelled as "uncooked" bacon, the cured pork bellies must have a weight not exceeding the weight of uncured pork bellies. Similarly, for cured pork bellies to be labelled as "cooked" or "precooked" bacon, the cured pork bellies must have a yield not more than 40% the weight of uncured pork bellies. That is, 60% shrinkage from the initial weight of the pork belly, also known as the "green weight," is required.

Frequently, however, commercial users such as restaurants require partial cooked or "par-cooked" bacon. This allows the user to complete cooking of the bacon to achieve desired texture, taste and mouth-feel. Par-cooked bacon is generally defined as cured pork bellies having a yield greater than 40% of the weight of uncured pork bellies.

The traditional process of curing pork bellies to create a bacon product entails the infusion of a dry cure or liquid pickle solution into the pork bellies. Infusion of the pickle solution creates an infusion weight that exceeds green weight. Depending on manufacturing capabilities and customer preference, infusion weight may be anywhere from 105% to 115% of green weight. To meet the regulatory product definitions of either uncooked, par-cooked or cooked bacon, a degree of weight loss must occur equal to or greater than the added weight of the injected pickle solution, i.e. the finished weight must be equal to or less than the meat portion prior to the injection of the pickle solution. Hence, to obtain the necessary weight reduction to meet the regulatory product definitions for bacon, the prior art has subjected the infused pork bellies to a prolonged low temperature cook cycle.

Historically, this slow cooking took place in smokehouses which achieved the necessary weight reduction and also imparted a smoke flavor characteristic of bacon. Modern techniques employ cooking ovens which heat the product to a core temperature of 115°–140° F. during a 4 to 5 hour cook cycle. This slow, low temperature heating produces a 10%–15% loss of injected weight without reaching temperatures to par-cook the pork bellies. The "smokehouse" treatment cooks-off the liquid portion of the pickle solution leaving behind the seasoning carried in the liquid thus curing the pork bellies and imparting the characteristic bacon taste. After the smokehouse treatment, the cured pork bellies are substantially fluid free.

Because of the use of modern slow cooking ovens, the smoke flavor is now produced in different ways. For circular bacon, created by two individual pork bellies cold formed together and encased within a casing, a smoke flavoring agent is added to the pickle solution. With strip bacon, the entire pork belly may also be subject to an atomized spray of smoke flavoring agent within the cooking chamber of the oven.

For fresh bacon, the "smokehouse" treatment causes adequate weight reduction to return the cured pork belly to green weight and therefore within the regulatory product definition for fresh bacon. After the smokehouse treatment, cured pork bellies intended to be sold as fresh bacon are weighed to assure the necessary loss of 10% weight from infused weight. Next, the internal temperatures of the cured pork bellies are chilled from 115°–140° F. to 20°–30° F. to facilitate slicing. The product is sliced and then packaged.

However, for par-cooked bacon, additional weight reduction is necessary to achieve shrinkage greater than 60% from green weight to bring the product within the definition for "par-cooked" bacon. After completion of the smokehouse treatment, cured pork bellies intended to be sold as cooked are weighed to assure loss of at least 10% weight from infused weight. The internal temperatures of the cured pork bellies are chilled from about 140° F. to 30° F. Again, such chilling is done to facilitate slicing. The bellies are sliced and then can be further cooked, typically in microwave ovens for about 1½ to 2 minutes depending on microwave amperage, conveyor belt speed through the microwave ovens to greater than 60% shrinkage from green weight.

Hence, curing pork bellies intended as "uncooked" bacon uses single step cooking employing solely the smokehouse treatment while cured pork bellies intended as "par-cooked" bacon uses a two step cooking employing both smokehouse treatment and a second cooking step. The prior art teaches that smokehouse treatment was necessary for curing pork bellies whether they were intended to be sold as fresh or par-cooked bacon.

U.S. Pat. No. 4,957,756 to Olander et al. suggests a method of eliminating smokehouse treatment of pork bellies. However, this method requires a lengthy step of holding the pork belly injected with pickle solution for 32 to 42 hours at temperatures of 40 to 45°. Olander teaches that such holding of the injected pork belly is necessary to achieve adequate dispersal of the pickle solution throughout the pork belly. Such a step greatly increases the costs of producing bacon even though smokehouse treatment has been eliminated.

It is apparent from the above that prior art methods are both time and energy intensive and contribute greatly to the cost of producing bacon. But with the market for par-cooked bacon product gaining in consumer popularity, prior to the development of the present invention, a need existed for methods to cure and process pork bellies into par-cooked bacon by reducing the costs and time associated with a two step cooking cycle and particularly with the smokehouse treatment.

SUMMARY OF THE INVENTION

According to the present invention, a novel method of curing and processing pork bellies into par-cooked bacon has been developed that eliminates both smokehouse treatment with a significant reduction in processing time and cost. Essentially, the method of the present invention employs a single cooking step that both par-cooks a pork belly infused with a pickle solution, including a smoke flavoring agent, and achieves the necessary weight reduction to meet the definition for par-cooked bacon. The method of the present invention may be employed for either strip form or circular form bacon.

Generally, the methods of the present invention follow traditional curing methods by infusing the pork bellies with pickle solution to 105%–115% of green weight. But instead of then subjecting the infused pork bellies to smokehouse treatment to achieve at least a 10% weight reduction, the methods of the present invention eliminate smokehouse treatment. In complete deviation from the prior art, the infused pork bellies are rapidly chilled to temperatures below those commonly used to facilitate slicing. Specifically, the pickle solution infused pork bellies are chilled to between 22° F. and 25° F. In either strip form or circular form, the reduced temperatures render the pickle solution within the pork bellies into a semi-solid. This retains pickle solution within the pork bellies, preserves the compositional integrity of the product, and facilitates handling of individual pork belly slices prior to cooking. Such reduced chilling temperatures also have the effect of cold setting the individual pork bellies that comprise circular form bacon. Reduced temperature chilling of the pickle solution infused pork bellies also permits thinner slicing of product.

Further, even though the methods of the present invention eliminate smokehouse treatment and employ only a slightly longer single step cooking resulting in a more than 60% shrinkage from infused weight results sufficient to meet the regulatory definition for par-cooked bacon. Yet, the methods of the present invention result in par-cooked product that when fully cooked, has the aroma, flavor, texture and appearance of bacon produced by smokehouse treatment with curing and processing time reduced by an estimated 30–35 hours.

Other advantages and aspects of the present invention will become apparent from the following detailed description of the invention.

DETAILED DESCRIPTION

Figure 1:
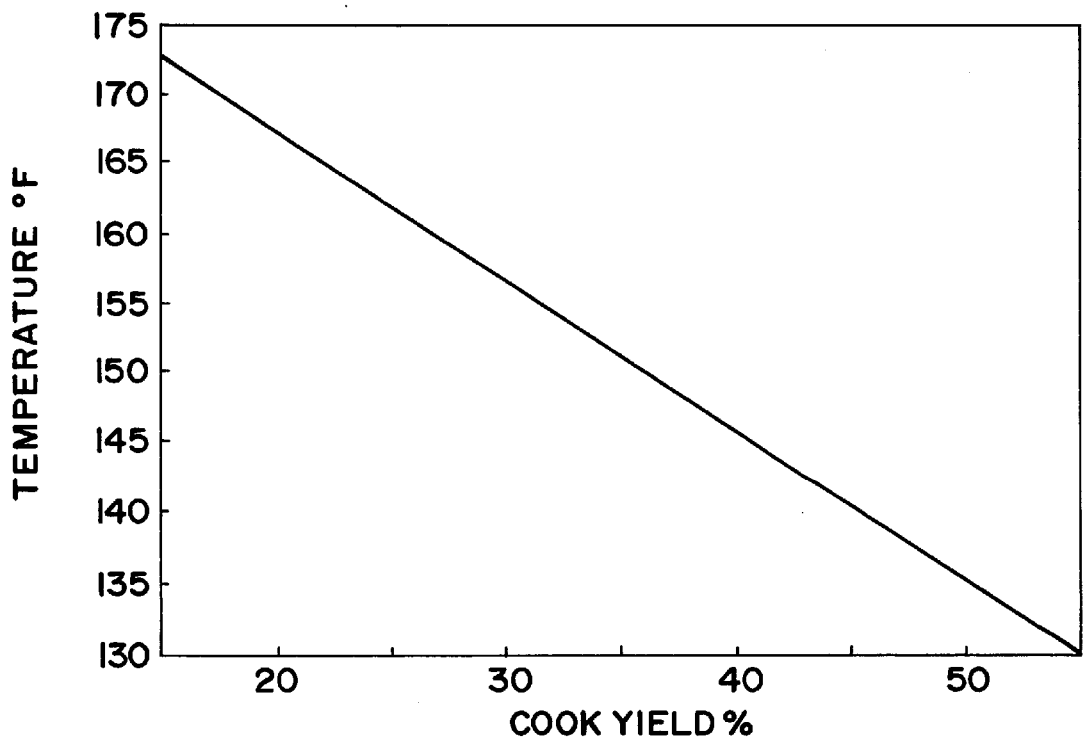
FIG. 1 is a graph disclosing the linear relationship between temperate (° F.) and cook yield (%) employed in the par-cooking process.

While this invention is susceptible of embodiment in many different forms, there is herein described in detail preferred embodiments of the invention with the understanding that the present disclosure is to be considered as an exemplification of the principles of the invention and is not intended to limit the broad aspect of the invention to the embodiments illustrated.

The methods of the present invention are directed to curing and processing pork bellies to produce sliced par-cooked bacon in either strip form or circular form without including the holding step of U.S. Pat. No. 4,957,756.

The single step cooking cycle employed by the methods of the present invention are generally no more than about 15% longer than second step cooking cycles known in the art for producing par-cooked bacon. Yet, unexpectedly the single step cooking cycle of the present invention results in substantial shrinkage from green weight to produce a par-cooked product meeting the regulatory definition for "cooked" bacon. Further, single step cooking, preferably by microwave or surface conduction cooking such as by heated conveyor belt surfaces, produces a par-cooked bacon product having all of the color, texture, aroma and flavor characteristic of par-cooked bacon. Hence, the method of the present invention eliminates (1) a 32 hour to 42 hour holding period to achieve pickle solution dispersal throughout the pork belly as required by the prior art (2) smokehouse treatment, (3) post-smokehouse weighing of product, and, (4) the need to chill smokehouse treated pork bellies from high internal meat temperatures of 140° F. to slicing temperatures of 30° F. The elimination of theses steps results in dramatic savings in processing times and costs.

The following Example describes in more detail the method of the present invention.

EXAMPLE

Par-Cooked Strip Form Sliced Bacon

Pork bellies of a selected weight and size are trimmed in the manner known in the art. Next, a seasoned pickle solution is injected into the trimmed pork bellies to preferably 110% of green weight using a multi-needle Formaco injector or such other injector known in the art. The seasoned pickle solution may have any composition known in the meat curing art. Smoke flavoring agent must be added to the pickle solution.

At this point, prior art techniques teach smokehouse treatment of the pork bellies. Instead, in accordance with the present invention, the encased pork bellies are chilled from temperatures of 35° F. To 40° F. (approximately ambient air temperature within a commercial packing plant) to no more than 25° F. and, preferably within the range of 22° F. to 25° F. It has been discovered that this temperature range cold-sets the pickle solution to thus retain the solution within the pork bellies by rendering the pickle solution a semi-solid.

As described above, the chilled pork bellies are then sliced to a thickness of 4–5% less than the thickness for pork bellies that have been subjected to smokehouse treatment. Such reduced thickness of the slices facilitates the necessary shrinkage and complete cooking of the product.

The slices are then immediately transferred to a cooking device. This device may include a conveyor belt having a heat conductive surface (also known as "belt grilling") or, as preferably practiced, by passing the slices on a conveyor belt through one or more microwave cooking chambers. With reference to the preferred commercial operation herein described, a multi-cavity Ferrite™ microwave unit was employed. The duration of par-cooking is dependent on the desired product yield. As disclosed in FIG. 1, product yield is a function of product core temperatures. However, one example of par-cooking the slices is to set the two transmitters of each cavity at maximum amperage setting levels of 4.20. This amperage setting achieves a temperature within each microwave cavity of about 220° F. Conveyor belt speeds had to be decreased from 600 inches/minute for sliced product that was subject to smokehouse treatment to 550 inches/minute for sliced product processed according to the present invention. Decreased belt speed increased total dwell time within all microwave cooking cavities from approximately 1 minute, 10 seconds to 1 minute, 20 seconds, or about a 15% increase in dwell time. Slice product emerging from the microwave cooking chambers posses the appearance, aroma, taste and texture of product processed according to the prior art two step cooking cycle.

By eliminating the steps of (1) smokehouse treatment, (2) the holding step required in the art, e.g. U.S. Pat. No. 4,957,756 (3) post-smokehouse weighing of product, and (4) the need to chill smokehouse treated pork bellies from internal meeting temperatures of 140° F. to slicing temperatures of 30° F., the present invention achieves substantial reductions in cost and processing time for producing par-cooked bacon products. For example, by eliminating the 4 to 5 hours necessary for smokehouse treatment, it has been estimated that substantial savings could be achieved in commercial scale production of par-cooked bacon products.

While the specific embodiments have been illustrated and described with reference to a preferred commercial operation, numerous modifications come to mind depending on the variables presented by other commercial operations, all without significantly departing from the spirit and intent of the invention. The scope of protection is only limited by the scope of the accompanying claims with reference to this specification.

We claim:

1. A method of curing and processing pork bellies to produce par-cooked sliced bacon using a single heating step and omitting any smokehouse treatment and any holding of infused bellies, consisting essentially of the steps of:

providing pork bellies having a preselected weight;

infusing the pork bellies with a seasoned liquid pickle solution;

chilling rapidly the infused pork bellies sufficient to render the seasoned pickle solution a semi-solid;

slicing the chilled pork bellies into a plurality of individual slices; and par-cooking the chilled slices to a final yield greater than 40% of the preselected weight.

2. The method of claim 1 wherein the step of infusing further includes:

infusing the pork bellies with a seasoned liquid pickle solution to obtain an injected weight exceeding the preselected weight.

3. The method of claim 2 wherein the injected weight is within the range of 105% to 115% of the preselected weight.

4. The method of claim 1 wherein the step of chilling includes chilling the pork bellies to between 22° F. to no more than about 25° F.

5. The method of claim 1 wherein the pickle solution includes a flavoring agent for imparting a smoke taste to the pork bellies.

6. The method of claim 1 wherein the slices are of strip form.

7. The method of claim 1 wherein the steps of par-cooking the slices includes:

passing the slices through a microwave cooking chamber.

8. A method of curing and processing pork bellies to produce strip sliced par-cooked bacon using a single heating step and omitting any smokehouse treatment and any holding of infused bellies, consisting essentially of the steps of:

providing pork bellies of a preselected weight;

infusing the pork bellies with a seasoned liquid pickle solution to obtain an injected weight exceeding the preselected weight;

chilling rapidly the infused pork bellies to a temperature less than 25° F.;

slicing the chilled pork bellies into a plurality of individual strip slices; and, exposing the chilled slices to a heat source to rapidly eliminate no more than 60% of injected weight.

9. The method of claim 8 wherein the step of chilling includes chilling the pork bellies to between 22° F. and less than 25° F.

10. The method of claim 8 wherein the pickle solution includes a flavoring agent for imparting a smoke taste to the pork bellies.

11. The method of claim 8 wherein the heating source includes a plurality of tandem arranged microwave cooking chambers.

\* \* \* \* \*

UNITED STATES PATENT AND TRADEMARK OFFICE
CERTIFICATE OF CORRECTION

PATENT NO.    : 6,214,393 B1
DATED         : April 10, 2001
INVENTOR(S)   : Brent J. Afman et al.

It is certified that error appears in the above-identified patent and that said Letters Patent is hereby corrected as shown below:

<u>Title page,</u>
Item [57], ABSTRACT,
Line 2, replace "eliminates" with -- eliminate --

<u>Column 1,</u>
Line 60, replace "Modem" with -- modern --

<u>Column 2,</u>
Line 4, replace "modem" with -- modern --

<u>Column 6,</u>
Line 11, replace "steps" with -- step --

Signed and Sealed this

Eighteenth Day of March, 2003

JAMES E. ROGAN
*Director of the United States Patent and Trademark Office*